United States Patent [19]
Stephenson et al.

[11] Patent Number: 6,072,581
[45] Date of Patent: Jun. 6, 2000

[54] GEOMETRICALLY-DESENSITIZED INTERFEROMETER INCORPORATING AN OPTICAL ASSEMBLY WITH HIGH STRAY-BEAM MANAGEMENT CAPABILITY

[75] Inventors: David Stephenson, Madison; Xavier Colonna de Lega, Middletown, both of Conn.

[73] Assignee: Zygo Corporation, Middlefield, Conn.

[21] Appl. No.: 09/183,057

[22] Filed: Oct. 30, 1998

[51] Int. Cl.$^7$ ............................................. G01B 9/02
[52] U.S. Cl. ........................... 356/356; 356/354; 356/359
[58] Field of Search ..................................... 356/354, 359, 356/360, 351, 356

[56] References Cited

U.S. PATENT DOCUMENTS

| | | | |
|---|---|---|---|
| 3,958,884 | 5/1976 | Smith | 356/106 R |
| 4,594,003 | 6/1986 | Sommargren | 356/349 |
| 4,714,348 | 12/1987 | MaKosch | 356/351 |
| 5,526,116 | 6/1996 | de Groot | 356/354 |
| 5,598,265 | 1/1997 | de Groot | 356/360 |
| 5,671,050 | 9/1997 | de Groot | 356/359 |

OTHER PUBLICATIONS

*Grating Interferometer for Flatness Testing,* Peter J. de Groot, Optics Letters, vol. 21, No. 3, Feb. 1996.

*Primary Examiner*—Robert H. Kim
*Attorney, Agent, or Firm*—Fish & Richardson P.C.

[57] ABSTRACT

The optical assembly of a GDI instrument is configured to deviate or steer stray beams away from the pupil of the instrument's imaging device and/or to suppress stray beams. Stray beam deviation is optimized by selecting particular wedge and/or tilt configurations that achieve the desired stray beam deviation while avoiding or at least minimizing phase offset at the optimum metrology plane. Stray beam suppression can be achieved by providing the diffractive groove profile of the instrument's optical assembly with smooth edges. The resultant profile facilitates effective diffraction order management as well as a reduction in back reflection. The invention is particularly well-suited for use with a GDI instrument in which the optical assembly comprises first and second diffraction gratings. In this case, any average phase offset that remains after setting wedge and/or tilt can be eliminated by inserting a suitable compensating plate between the first and second diffraction gratings or between the second diffraction grating and the object.

32 Claims, 6 Drawing Sheets

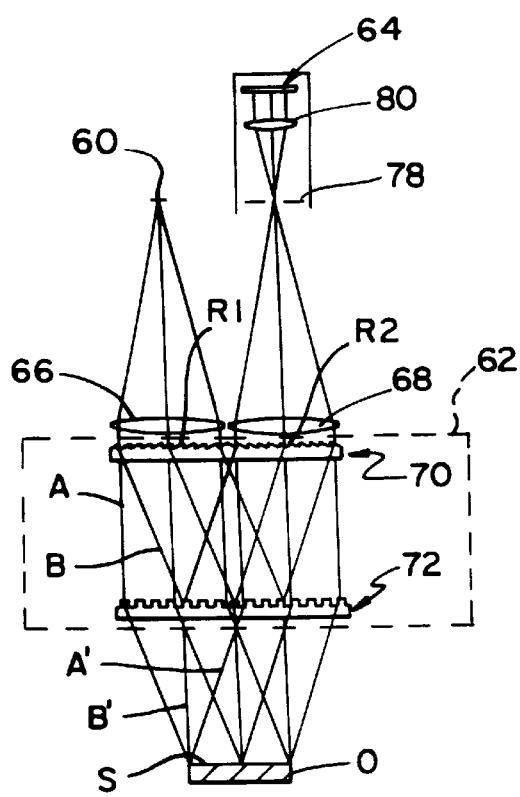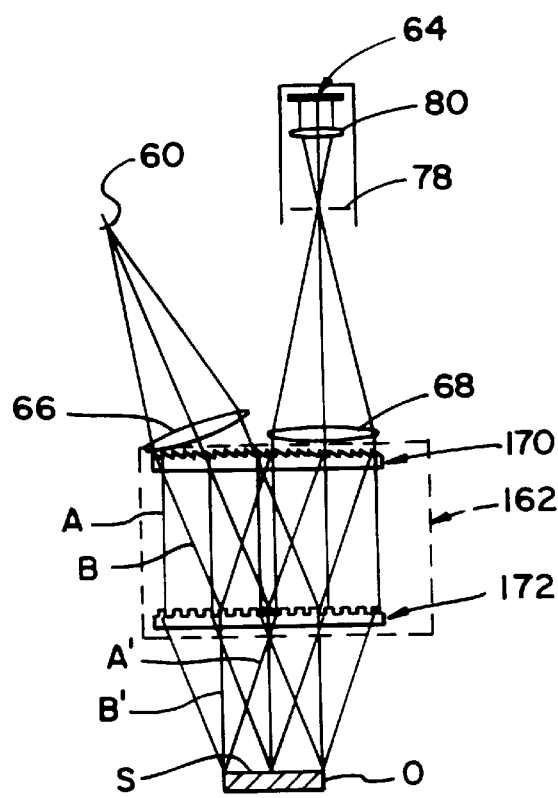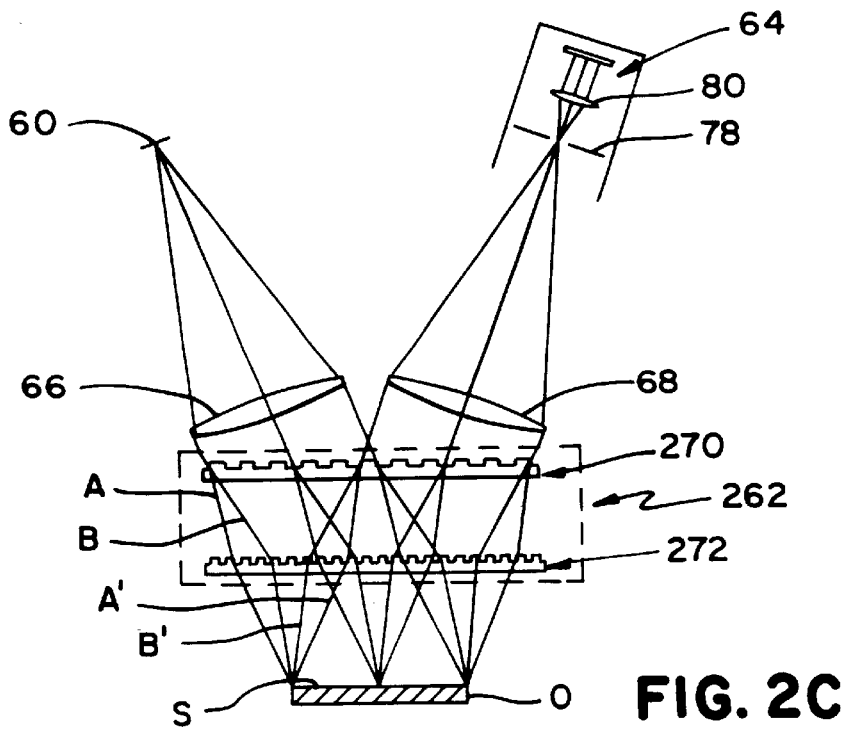

GEOMETRICALLY-DESENSITIZED INTERFEROMETER INCORPORATING AN OPTICAL ASSEMBLY WITH HIGH STRAY-BEAM MANAGEMENT CAPABILITY

BACKGROUND OF THE INVENTION

1. Field of the Invention

The invention relates to interferometers and, more particularly, relates to a geometrically-desensitized interferometer (GDI) instrument for surface profiling. Even more particularly, the invention relates to a GDI instrument that includes an optical assembly configured to redirect and/or suppress stray beams. The invention additionally relates to a method of operating an interferometer with improved stray beam management capability.

2. Discussion of the Related Art

Optical metrology of surface profiles can generally be divided into two regimes, namely interferometric and geometric. Geometric techniques include triangulation and moiré fringe analysis, which involves the projection and imaging of a periodic structure such as a ronchi ruling. Geometric techniques are relatively insensitive to surface roughness and deformations, but are of relatively low resolution—so low, in fact, that they are unsuitable for many applications in which surface profiles must be measured with high precision.

Interferometry, on the other hand, relies on the wave nature of light to ascertain with high precision the surface profile of a test object. A typical traditional interferometer includes a light generator that generates a beam of light, a spatial filter-beam diverter that diverts the light beam into a diverging spherical wavefront, a beamsplitter that diverts part of the diverging spherical wavefront from the filtered beam, and a collimating lens that collimates the wavefront to produce a plano wavefront of coherent light. This wavefront of coherent light is then reflected off test and reference surfaces to produce first and second reflected wavefronts which combine with one another while interfering both constructively and destructively to produce an interference fringe pattern. An imaging device such as a solid state camera receives the recombined wavefronts and acquires images of the interference fringe pattern. The interference fringe pattern then is analyzed to obtain information about the surface profile of the test object.

Fringe pattern analysis for surface profilometry often is performed by the well-known technique of phase shifting interferometry (PSI). In PSI, the height difference between locations on a surface imaged by first and second pixels on the imaging device is determined by first determining a phase difference between light received at the first and second pixels and by then using the phase difference to calculate a height difference. A primary advantage of PSI is that it is highly precise. The vertical height precision for PSI is a fraction (e.g., $1/100$) of the optical wavelength of the light source used to conduct the measurement.

Generally speaking, however, conventional PSI approaches can only profile smooth surfaces having relatively small height variations or "surface departures" between adjacent measurement sites. This constraint results from the fact that PSI has a phase ambiguity constraint. Specifically, the maximum physical departure between adjacent measurement sites on the profiled surface must be less than $1/4$ of the source wavelength. Stated another way, the maximum phase difference between the reference and test light beams must have an absolute value which is less than $\pi$. This constraint, sometimes known as "two $\pi$ ambiguity", arises because the arctangent function, which is used to convert phase to distance, is only unique within the range of $\pm\pi$. Thus, although the use of phase measurements advantageously allows very high precision to be obtained, it disadvantageously limits the maximum surface departure between adjacent measurement sites to one quarter of the source's optical wavelength. A further difficulty with PSI arises when the surface slope is so large that it becomes difficult to resolve or distinguish the interference fringes because the fringe density is too high. Therefore, while PSI interferometry is much more precise than geometric optical profilometry, it historically has been considered to be ill-suited for use with rough objects or objects having marked surface deformations. Interferometers using PSI analysis therefore historically have not been considered appropriate for some surface profilometry applications.

One interferometric technique that lacks the quarter-wavelength constraint of PSI is the so-called scanning white light interferometry or SWLI. In SWLI, a white light illumination source or, more generally, one which is of a broad-band as opposed to being of a narrow-band generates an interference pattern which contains regions of high contrast for each location on the test surface as a function of scan position. The scan position of high contrast for a given pixel indicates the height of the corresponding location on the test surface. Therefore, by comparing the temporal characteristics of these regions of high contrast with one another, a difference in height between two locations on the profiled surface can be determined. Unlike PSI, SWLI does not calculate height differences based on phase differences, and the PSI phase constraint therefore does not apply to SWLI. The maximum physical departure between adjacent measurement sites on a profiled surface therefore may be much larger with SWLI than with PSI.

However, SWLI has disadvantages of its own that hinder its use in industrial applications. For instance, the field of view is generally no larger than can be accommodated by standard microscope objectives. To function correctly, the imaging device of the instrument must have high resolution when compared to the corresponding interference fringe density. When the field of view of the typical SWLI instrument is increased, the fringe density can easily become difficult to resolve even with very high resolution imaging devices. This problem is especially evident during the profiling of rough surfaces. Moreover, slope tolerance for specular surfaces decreases linearly with the field size, and the speckle effects required for rough-surface measurements are only resolvable if the numerical aperture (NA) of the objective decreases linearly as the field increases. The need to resolve the speckle pattern from rough surfaces is the most discouraging, since the amount of collected light decreases with the square of the NA. The light loss means that larger surfaces require a more powerful illuminator. Worse, the fringe contrast is now a highly variable parameter, and the quality of the measurement depends critically on the balance between the reference and object beam intensities.

Another disadvantage of typical SWLI techniques is that data acquisition is very slow. The slow speed is a consequence of the rapidly varying interference effect as a function of scan position. Accurate measurements require that these variations be recorded in detail, usually at the rate of one measurement per pixel per 75 nm of scan motion.

Still another disadvantage of typical SWLI is its high sensitivity to vibration. An instrument configured for SWLI analysis generally requires massive mounting fixtures and expensive vibration isolation.

Recent years have seen an increased demand for the high speed, high precision metrology of the surface profiles of manufactured parts having large surface departures, i.e., having rough surfaces or surfaces with pronounced surface deformations. A corresponding demand has arisen for the acquisition of data during production as opposed to in the laboratory. For instance, precision products such as hard disks for computer disk drives need to be profiled with high precision, at high speeds, and under conditions in which the test object may be subjected to substantial vibrations during manufacturing processes. Neither traditional PSI techniques nor traditional SWLI techniques are suitable for these purposes. A need therefore has developed for a "desensitized" interferometer that is relatively insensitive to surface roughness and surface deformations, that performs surface metrology with high accuracy and at high speeds, and that is relatively insensitive to vibrations and therefore is well-suited to production-line use.

This need has been met to a large extent by the development of the geometrically-desensitized interferometer (GDI) instrument. As is discussed in an article by de Groot entitled "Grating interferometer for flatness testing" Opt. Lett. 21(3) 228–230 (1996), a GDI instrument is characterized by the replacement of the beam splitter of the traditional instrument with an optical assembly located between the collimating lens and the test object. The optical assembly, which typically (but not necessarily) comprises a diffraction grating assembly, a hologram, or diffractive optics in combination with conventional optics such as mirrors and lenses, divides the collimated source light into two beams which propagate in two different directions and impinge on the profiled surface at the same location but at different incident angles. The beams reflect from the profiled surface and pass back through the optical assembly in different directions, after which they are recombined. Constructive and destructive interference of the reflected and recombined beams form an interference fringe pattern having an equivalent wavelength that may be orders of magnitude larger than the source wavelength. As a result, the GDI instrument is much less sensitive to height variations and surface deformations than are traditional interferometers using PSI analysis techniques. Many disadvantages associated with SWLI such as a limited field of view, a slow acquisition speed, and a high sensitivity to vibration therefore are avoided. The sensitivity of GDI instruments is intermediate between conventional interferometry and moiré fringe analysis, and is comparable to that obtained with grazing-incidence interferometry. GDI instruments therefore can be used in manufacturing applications and other applications that are unsuitable for traditional interferometry.

A characteristic of GDI instruments that has not heretofore been fully addressed is that they lack fully-effective stray beam management measures. "Stray beams" are beams of light that propagate from the optical assembly of the GDI instrument to the pupil of the instrument's CCD camera or other imaging device and that degrade the instrument's effectiveness. Stray beams can be divided conceptually into two categories, namely 1) "back reflections" and, 2) ghost images. Each of these two types of stray beams and their attendant problems will now be discussed.

Back reflections result from the multiple-reflection and diffraction of light within the diffraction gratings or other components of the optical assembly of the instrument, and are present even in the absence of a test object. In the usual case in which the optical assembly comprises a pair of diffracting gratings, back reflections may result, e.g., from reflection or diffraction on the various air-glass interfaces, imperfections in the grating's substrate, sharp edges on the grating's groove profile, etc. For instance, and as illustrated in FIG. 8, stray light may propagate from the coarse grating G1 of a typical GDI instrument by reflecting from the back surface of its substrate as rays R1, by reflecting from the fine grating G2 itself as rays R2, or by reflecting from the back of the fine grating substrate as rays R3. The back reflections are superimposed on the properly-propagating reflected beams A', B' as noise. This noise can significantly reduce the accuracy of GDI measurements, particularly when the test object surface reflects light poorly and, accordingly, produces only a relatively weak interferometric measurement signal with a correspondingly high signal-to-noise ratio.

Attempts have been made to ameliorate the effects of back reflection on a GDI instrument by introducing wedge and/or tilt into the diffraction gratings or other optical elements of the instrument's optical assembly so as to direct back reflections away from the pupil of the instrument's CCD camera or other imaging device. However, heretofore, directing stray beams away from the imaging device pupil have complicated the setup and alignment of the instrument. In order to achieve the best measurement accuracy, the test surface must be positioned in space near to an optimum metrology plane. The optimum metrology plane is defined as that ideal test surface for which beams reflecting at different angles from any single surface location on the ideal test surface recombine and impinge upon the instrument's imaging device at a single location. The introduction of wedge and/or tilt into the diffraction gratings can result in a marked phase offset when the test object surface is properly positioned near the optimum metrology plane. Phase offset is an optical phase difference proportional to the difference in optical path length of the beams reflecting from a given point on the test object surface. When the instrument employs an extended light source, phase offsets can result in significant displacements of the location of maximum interference fringe contrast from the optimum metrology plane. The net result is that the position in space corresponding to optimum fringe contrast is not always coincident with the optimum metrology plane. Depending on the particular configuration of the instrument, it is also possible that the phase offset changes linearly across the field of the instrument. For convenience we thus separate the overall effect in two contributions: 1) an average phase offset, measured as a distance L in the Z direction from the optimum metrology plane; 2) a phase offset variation expressed as the number of tilt fringes appearing in the field of the instrument when the object is at the optimum metrology plane.

As a result of the phase offset referred to in the previous paragraph, it was heretofore necessary to first translate the test object to locate the position of maximum fringe contrast, and to then translate the test object an additional preset amount in order to locate the position of the optimum metrology plane. This additional object translation requires considerable skill on the part of the operator and complicates instrument operation. An additional complication is that the fringe contrast is generally poor when employing an extended light source when the test object is properly positioned within the optimum metrology plane.

A proposal has been made to improve a GDI instrument's ability to measure a variety of surfaces with both high contrast and high accuracy. Specifically, U.S. patent application Ser. No. 09/003,449 to de Groot (the de Groot application), filed Jan. 6, 1998 and entitled "Geometrically-Desensitized Interferometer with Adjustable Range of Measurement Depths," proposes a GDI instrument having a variable-geometry light source that can be manipulated to switch the instrument between 1) a low coherence operational mode, in which the instrument has an extended source and consequently a small coherence envelope, and 2) a high coherence operational mode, in which the instrument has a narrow source and consequently a large coherence envelope. The low coherence operational mode is employed in the setup of the instrument to assist in the location of the optimum metrology plane. Once this plane is identified, the system is switched into high coherence mode to improve fringe contrast for all subsequent measurements. Although the ability to switch between coherence modes facilitates the proper operation of the instrument, the de Groot application does not teach how to eliminate phase offsets at the optimum metrology plane and in this way eliminate the need to switch between coherence modes every time a test object is aligned for measurement.

Turning now to the issue of stray beams that can cause ghost images, these ghost images are caused by stray beams coming from the object through the system in an undesired or unanticipated manner, resulting in duplicate images that can overlap the desired image and degrade its quality. These object ghosts can be understood in conjunction with FIG. 9, which schematically illustrates a GDI instrument in which the gratings G1 and G2 of the optical assembly are designed to transmit only a first diffraction order A of −1 and a second diffraction order B of +1. Propagation of other diffraction orders such as the undesired $0^{th}$ diffraction order C produces ghost images of the test object surface in the interference pattern that are identical to but spatially offset from the true images produced by useful diffraction orders. In a GDI instrument having inadequate diffraction order management capability, an incident beam generates a number of additional diffraction rays both in transmission and in reflection when it strikes a grating and generates diffraction rays of useful orders.

It is therefore understood in the art that proper GDI design requires suppression of the unwanted diffraction orders (see for example the aforementioned article by de Groot, entitled "Grating interferometer for flatness testing"). However, suppression of the principal unwanted diffraction orders, such as the $0^{th}$ diffraction order shown in FIG. 9, generally leads one to employ rectangular or triangular (also known as "blazed") groove profiles. These profiles can generate weak, high-order diffracted beams because of their sharp edges. The term "high order," as used herein, refers to beams of third order and higher. Even though these high diffraction orders are weak because of low diffraction efficiency, some of them have very high angles of incidence on the AR coated surface of the substrate. They are therefore reflected very efficiently back towards the imaging device of the instrument. Some of these diffraction orders even undergo total internal reflection, resulting in comparatively bright stray light paths that contribute to back reflections. The worst case is when the gratings have plane, parallel substrates that are themselves parallel to the object plane. In this case, many of the multiply-reflected and diffracted rays inside the grating assembly are parallel to the optical axis of the imaging device. As a result, the added contributions can actually flood the detector if the source power is high. Thus, it is seen that one possible consequence of suppressing ghost images is the generation of additional unwanted back reflections.

The need therefore exists to design the optical components of a GDI instrument so that stray beams either are not generated or are deviated away from the pupil of the imaging device.

OBJECTS AND SUMMARY OF THE INVENTION

It is therefore a principal object of the invention to provide a GDI instrument having an optical assembly that reduces the number of back reflections from the grating assembly to the instrument's imaging device while maintaining high measurement accuracy and minimal ghost imaging.

In accordance with a first aspect of the invention, the optical assembly of a GDI instrument incorporates measures to steer or deviate stray beams away from the pupil of the instrument's imaging device while minimizing or even avoiding average phase offset when the test object surface is in the optimum metrology plane, and preferably while minimizing or even avoiding phase offset variations within the optimum metrology plane as a function of field position. In the usual case in which the optical assembly includes a pair of spaced diffracting gratings, the gratings as well as the object can be tilted about the Y axis and/or the X axis, and wedge direction and wedge angle can be set independently for both gratings. Wedge, tilt, and substrate thickness are not necessarily equal for both gratings. If design constraints or other factors prevent phase offset minimization using wedge and tilt alone, phase offset can be reduced further or even eliminated by placing a transparent compensation plate between the first and second gratings or between the second grating and the test object.

A second principal object of the invention is to provide a GDI instrument incorporating an optical assembly exhibiting improved stray beam suppression when compared to prior known GDI instruments.

Still another object of the invention is to provide a GDI instrument that meets the second principal object and that exhibits improved diffraction management capability.

In accordance with yet another aspect of the invention, these objectives are achieved by forming smoothed groove profiles on the diffractive surface of one or both of the diffraction grating assemblies. The smooth profile, lacking sharp edges, facilitates ghost image suppression while reducing the amount of back reflection, making it easier to direct the remaining back-reflecting beams away from the pupil of the imaging device with less aggressive wedge and/or tilt schemes.

Other objectives, features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIGS. 2A–2C illustrate first, second, and third possible configurations of an optical assembly of the instrument of FIG. 1;

DETAILED DESCRIPTION OF THE PREFERRED EMBODIMENTS

1. Solution Overview

The invention resides in the design of the optical assembly of a GDI instrument to deviate or steer stray beams away from the pupil of the instrument's imaging device and/or to suppress stray beams. Stray beam deviation is optimized by selecting particular wedge and/or tilt configurations that achieve the desired stray beam deviation while avoiding or at least minimizing phase offset at the optimum metrology plane. As discussed in the Background Section above, phase offset is an optical phase difference proportional to the difference in optical path length of the beams reflecting from a given point on the test object surface and can include average phase offset and/or phase offset variation. Also as discussed above, phase offset results in a significant displacement of the location of maximum interference fringe contrast from the optimum metrology plane when the instrument employs an extended light source. Stray beam suppression can be achieved by providing the groove profile of the instrument's diffractive optical assembly with smooth edges. The resultant profile facilitates effective diffraction order management as well as a reduction in back reflection. The invention is particularly well-suited for use with a GDI instrument in which the optical assembly comprises first and second diffraction gratings. In this case, any average phase offset that remains after setting wedge and/or tilt can be eliminated by inserting a suitable compensating plate between the first and second diffraction gratings or between the second diffraction grating and the object. A preferred embodiment of a generic GDI instrument incorporating these features will now be described, along with various specific embodiments and concrete examples.

2. GDI Instrument Structure

Figure 1:
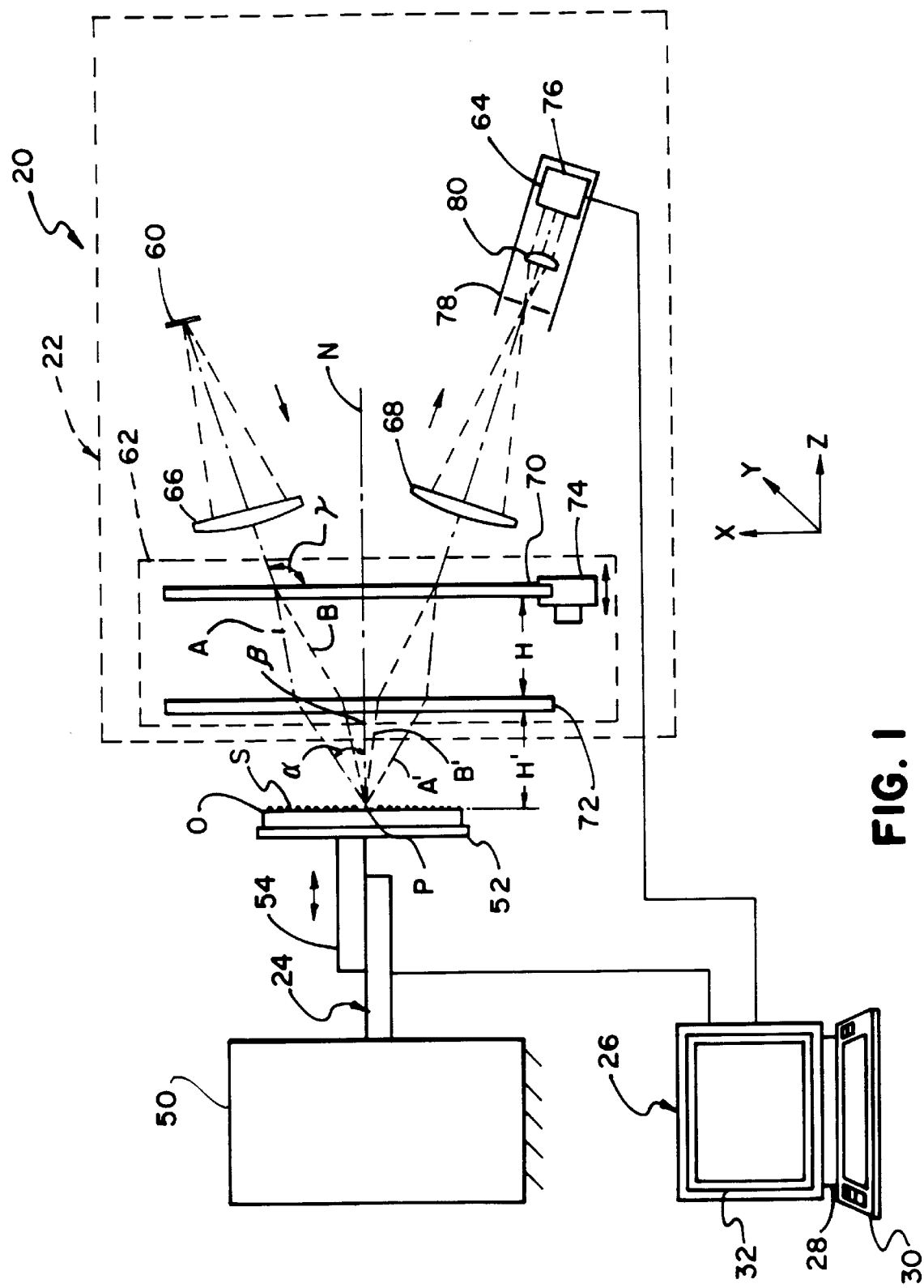
FIG. 1 schematically represents the operative components of a geometrically-desensitized interferometer (GDI) instrument constructed in accordance with a first preferred embodiment of the present invention.

Referring now to FIG. 1, a GDI instrument 20 constructed in accordance with a first preferred embodiment of the invention includes a mainframe 22, a test object support stand 24, and a computer 26. The computer 26 is coupled to at least the mainframe 22 and, in the illustrated embodiment in which the object support stand 26 includes a scanning stage 54 (detailed below), is also coupled to the scanning stage to control the displacement of the test object O towards and away from the mainframe 22.

The computer 26 may comprise any general purpose programmable computer capable of controlling operation of the mainframe 22 and/or of the scanning stage 24. The computer 26 includes a casing 28 that houses a processor, a RAM, a ROM, etc., a keyboard 30 for entering data, and a monitor 32. The computer 26 could be replaced by an internal electronic processor that is disposed within the mainframe casing 22 and that performs all of the data manipulation functions of the computer 26. In this case, display functions would be performed by a stand-alone monitor coupled directly to the mainframe 22.

The test object support stand 24 may comprise any structure capable of supporting a test object O in a position in which a surface S to be profiled receives light transmitted from the mainframe 22 and reflects light back to the mainframe 22. The support stand 24 may be separated from the mainframe 22 as illustrated or, alternatively, may be operatively and/or physically coupled to the mainframe 22 to form an assembly. In the illustrated embodiment, the support stand 24 includes a stationary base 50, a support bed 52, and a scanning stage 54 which couples the support bed 52 to the base 50. The scanning stage 54 is disposed so as to displace the bed 52 and the object O in a direction substantially perpendicularly to the surface S for focusing purposes or for the purpose of depth scanning. Depth scanning is detailed in U.S. Pat. No. 5,598,265 to P. de Groot, the subject matter of which is hereby incorporated by reference for its disclosure of depth scanning using a GDI instrument.

The operative components of the GDI instrument include a light generator 60 which generates light, an imaging device 64, a collimating lens 66 which is disposed between the light generator 60 and the optical assembly 62 to collimate the light entering the optical assembly 62 from the light source 60. A similar lens 68 is disposed between the optical assembly 62 and the imaging device 64.

The light generator 60 may comprise any extended light source and accompanying structure commonly used in GDI instruments. For instance, the light generator 60 could comprise a line shaped light generator such as a linear LED array. A light generator including a laser diode as its light source is currently preferred because laser diodes are inexpensive when compared with many other lasers yet provide bright illumination for rough surfaces.

Similarly, the imaging device 64 may comprise any device or system capable of receiving the interfering beams or wavefronts from the diffraction grating assembly 62 and of producing images of the resulting interference pattern. The human eye is considered to be an imaging device within the context of the present invention. In the illustrated embodiment, the imaging device 64 is a small imaging lens 80 and a solid state charge coupled device (CCD) 76 having a pupil in the form of an inlet aperture 78.

The purpose of the optical assembly 62 is to increase the equivalent wavelength of the light generator 60 so as to desensitize the instrument to $2\pi$ ambiguities and other problems associated with traditional interferometers and hence to enhance the instrument's ability to perform profile metrology on rough surfaces. The optical assembly 62 could comprise a hologram, a system of lenses, or any other structure that splits a beam of light from the light generator 60 into two beams A and B that impinge on the profiled surface S of the test object O at the same location P but at different incident angles. The preferred optical assembly 62 comprises a diffraction grating assembly having one or more diffraction gratings, and the assembly 62 will henceforth be referred to as a "diffraction grating assembly" for the sake of convenience.

The illustrated diffraction grating assembly 62 includes first and second parallel linear gratings 70 and 72 that extend at least generally in respective XY planes (where the X axis extends into and out of the page in FIG. 1 and the Y axis extends vertically in FIG. 1) and that are spaced from one another in a Z direction or horizontally in FIG. 1. The second, or fine grating 72 typically (but not necessarily) has a grating frequency twice that of the first, or coarse grating 70. In the illustrated embodiment, the first grating 70 has a grating frequency of 250 lines per millimeter, and the second grating 72 has a grating frequency of 500 lines per millimeter. The second grating 72 produces the advantage of permitting the distance H' between the output of the diffractive grating assembly 62 and the optimum metrology plane containing the profiled surface S of the test object O to be increased from zero to virtually any selected distance by setting an appropriate spacing H between the first and second gratings 70 and 72. This distance may be varied under computer control for the purpose of depth scanning as detailed in the de Groot '265 patent.

Various optical assemblies usable as the optical assembly 62 or in place of it are illustrated in FIGS. 2A–2C. In each of these embodiments, each diffractive grating includes a substrate formed from BK7 glass, has a front diffractive surface, and has a rear surface coated with an antireflective (AR) material. In each embodiment, the groove profile of the diffractive surface of at least the first or coarse grating 70 can be tailored to achieve the desired stray beam suppression effect.

For instance, in the embodiment of FIG. 2A, the diffractive surface of the first grating 70 consists of two distinct blazed regions R1 and R2 that are symmetric about the centerline of the grating 70. The triangular profile of region R1 is optimized so that light is mainly diffracted in orders of 0 and +1. Order –1 is considerably reduced. Similarly, the profile of region R2 diffracts light in orders of 0 and –1 while reducing +1 it order diffraction. The diffractive surface of the second grating 72 has a square profile and is adapted to suppress the $0^{th}$ order transmission and to concentrate light in the +1 and –1 orders. A beneficial characteristic of this arrangement is that the space requirements of the instrument can be minimized because both lenses 66 and 68 can remain parallel with the XY plane.

In the embodiment of FIG. 2B, the first grating 170 differs from the first grating 70 of the embodiment of 2A only in that its blazing extends only in one direction. Hence, the entire diffractive surface of the grating 170 transmits the same, $+1^{th}$ diffraction order. Therefore, in order for the desired diffraction orders to be transmitted to the imaging device 64, either the imaging device 64 or the light generator 60 and its associated lens 66 or 68 must be inclined relative to the Z axis. A somewhat less compact design results. The optical assembly 162 otherwise is identical to the optical assembly 62 of FIG. 2A and, accordingly, is designated by the same reference numerals, incremented by 100.

In the embodiment of FIG. 2C, the first and second diffraction gratings 270 and 272 both have square profiles. Hence, both gratings transmit the $+1^{th}$ and $-1^{th}$ diffraction orders while suppressing the $0^{th}$ diffraction order. This arrangement is the least compact of the three described herein because the light generator 60, the imaging device 64, and their associated lenses 66 and 68 must be inclined relative to the Z axis in order to achieve the desired effect. However, the embodiment of FIG. 2C benefits from being achromatic, meaning that the equivalent wavelength is substantially independent of the source wavelength. The optical assembly 262 otherwise is identical to the optical assembly 62 of FIG. 2A and, accordingly, is designated by the same reference numerals, incremented by 200.

In use, the light generator 60 of the GDI instrument 20 generates a beam of light which is collimated by the lens 66 before impinging on the first diffraction grating 70 of the diffraction grating assembly 62 at an incident angle γ. The first grating 70 diffracts the incident beam into two beams A and B. These beams are then redirected by the second grating 72 so that they impinge on the test surface S of the object O. Reflected beams A' and B' originate from the same location P on the surface S but propagate at different incident angles (assuming that the surface S is at the optimum metrology plane) and travel back through the second and first gratings 72 and 70 so as to recombine with constructive and destructive interference. The interfering beams or wavefronts are then focused by the lens 68 and imaged by the imaging device 64. The imaged interference fringe pattern is then analyzed by the computer 26, e.g., by a PSI analysis to obtain a precise profile measurement.

In any of the three optical assembly configurations 62, 162, or 262 described above, the shapes, orientations, and/or profile characteristics of the assembly's diffraction gratings can be selected to steer stray beams away from the pupil 78 of the optical assembly 64 and/or to suppress stray beams. For ease of description, the discussion that follows in Sections 3 and 4 will focus on the optical assembly 62 of FIG. 2A. However, it should be understood that the same description applies equally as well to the optical assemblies 162 and 262 of FIGS. 2B and 2C, to other diffraction grating arrangements, and to other optical assemblies usable in GDI instruments.

3. Back Reflection Deviation Management

Back reflections from the gratings 70 and 72 can be deviated away from the pupil 78 of the imaging device 64 by suitable control of the shape and/or orientation of each of the diffraction gratings 70 and 72 as well as by control of the orientation of the test object O. Control based on selection of the orientation of the diffraction grating or object is known as tilt selection or tilt management, and control based on selection of the shape of the diffraction grating 70 or 72 is known as wedge selection or wedge management. Each of these concepts now will be defined in turn.

Figure 3A:
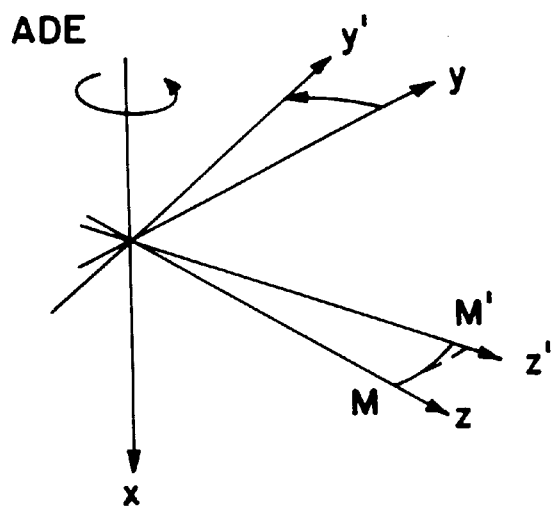
FIGS. 3A and 3B illustrate rotation angles ADE and BDE, respectively, that follow the code V convention of lens design protocol.
Figure 3B:
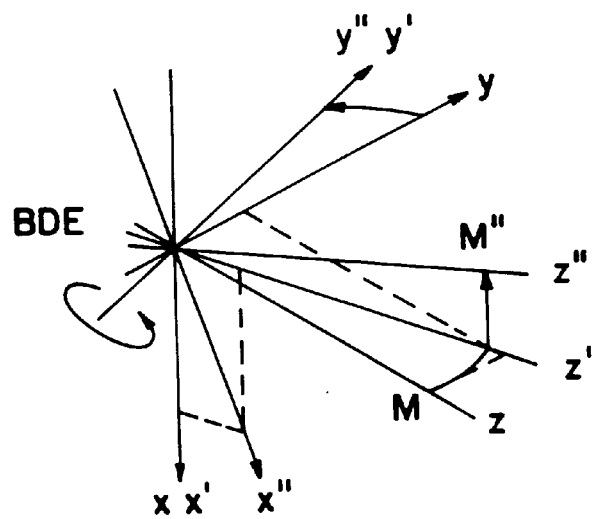

Referring now to FIGS. 3A and 3B, an object's tilt can be thought of as its angle of rotation in space about the X axis or the Y axis. The illustrated angles follow the geometrical convention used in the lens design program Code V. The rotation angle ADE describes the rotation of the different surfaces defining the grating substrate about the X axis. The rotation angle BDE describes the rotation angles of the same surfaces about the Y axis. The rotation angles ADE and BDE are well known to those skilled in the art and, accordingly will not be described in further detail. Suffice it to say that those skilled in the art will understand the orientation of an object as described by terms of its ADE tilt and BDE tilt.

Wedge describes the departure of a diffraction grating substrate shape from a perfectly rectilinear structure. Wedge angle is the angle between the front and back surfaces of a substrate of a diffraction grating, nominally equal to zero for parallel surfaces. Wedge direction is a direction within the plane of a surface of the substrate for which the wedge has the greatest magnitude.

Figure 4:
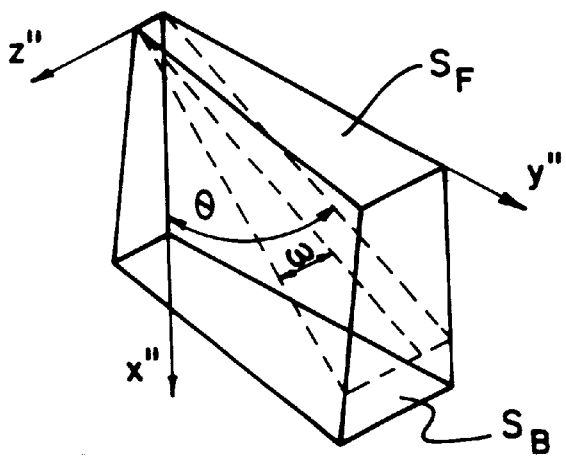
FIG. 4 schematically illustrates direction and slope in a prism formed by the back surface of a substrate with respect to its front surface.

Referring now to FIG. 4, the wedge of a grating also may be described in terms of two angles θ and ω that represent the direction and slope of the prism formed by the back surface $S_B$ of each substrate with respect to its front surface $S_F$. Hence, one grating can be described by the couple (ADE, BDE) of its diffractive surface with either the couple (ADE, BDE) of its back surface or the couple (θ,ω) defining the equivalent prism.

When both wedge and tilt are taken into account, a single grating can be described by the couple of the rotation angle ADE or BDE of its diffractive surface with either the couple (ADE, BDE) of its back surface or the couple (θ, ω) defining the equivalent prism.

Suitable selection of both wedge and tilt can steer stray beams away from the pupil 78 of the imaging device 64 while still avoiding or at least minimizing average phase offset as well as phase offset variation at the optimum metrology plane, provided that one has adequate flexibility in the range of selection of both wedge and tilt. Simplified wedge and tilt control schemes can eliminate or at least minimize average phase offset while reducing phase offset variations to tolerable levels. Optimal stray beam management typically involves setting of ADE tilts and BDE tilts on the order of 2°, maximum wedge of about 2° to 2.5°, and maximum wedge direction on the order of 45°. Groove profile selection is described in Section 4 in conjunction with stray beam suppression, and specific examples of wedge and tilt control are described in Section 5 below.

4. Stray Beam Suppression

As discussed in Section 3 above, some combinations of wedge and tilt may not steer all back reflections away from the pupil 78 of the imaging device 64. Potential detrimental effects of this incomplete back reflection deviation can be reduced if some of the back-reflecting beams are eliminated altogether by stray beam suppression.

Figure 5:
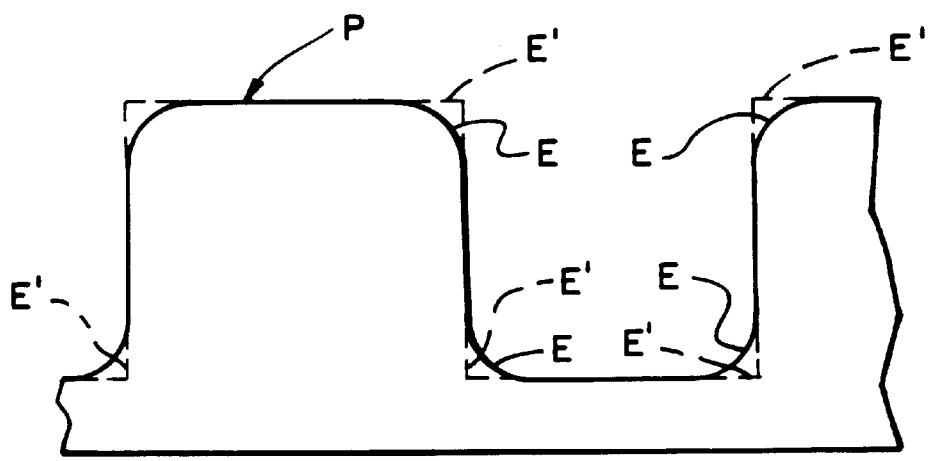
FIG. 5 schematically represents a portion of a diffractive surface of a diffraction grating usable in a GDI instrument constructed in accordance with the present invention.

Stray beams can be suppressed quite effectively by forming non-traditional groove profiles on diffractive surfaces. The traditional square groove profile on the grating 270 or 272 of FIG. 2C has sharp corners. Light striking these edges generates high-order diffraction rays that can undergo total internal reflection inside the substrate so that they reflect back towards the grating 270 or 272, exacerbating the back-reflection problem. This problem can be alleviated by modifying the traditional grating profile so that it lacks these sharp edges. Hence, referring to FIG. 5, high-order diffractions and other stray beams can be suppressed by softening the edges of a groove profile P so that those edges are curved, preferably non-linearly and with a relatively high radius of curvature. The curved portions are illustrated by the solid lines E in FIG. 5 and are to be distinguished from the sharp edge portions of traditional square groove gratings illustrated by the phantom lines E'. The smooth edge portions E are easily produced using current etching technologies and other technologies commonly employed to produce groove profiles on diffractive surfaces. Of course, the same technique can be used to smooth the edges of triangular grooves of blazed gratings.

5. Examples

The manner in which back reflection management and stray beam suppression management can be used, alone or in combination with one another, to improve the quality of an interferogram will now be described by way of several practical examples. All of these examples apply to an optical assembly 262 as seen in FIG. 2C and satisfy fully or partially the following three requirements:

1. The steerage of back reflected stray beams away from the pupil 78 of the imaging device 64;

2. The minimization or elimination of average phase offset; and

3. The minimization or elimination of phase offset variations over the instrument's field of view.

Partial fulfillment of these conditions occurs when the average phase offset is zero or nearly zero, but some limited phase offset variation remains across the instrument's field of view.

The instrument to which these examples apply has the following characteristics:

Light source average wavelength: 0.68 microns.

Spatial frequency of first (coarse) grating 270: 250 lines/millimeter.

Spatial frequency of second (fine) grating 272: 500 lines/millimeter.

Distance H' between the gratings 270 and 272: ≈75 millimeters (this distance changes for different substrate thickness).

Width of pupil 78: ±12 mrad (this range defines the largest deviation from the optical axis of a ray that still goes through the pupil 78. Consequently, all stray beams must be deviated by more than 12 mrad from the optical axis).

Substrate material for the diffraction gratings 270 and 272: BK7 glass.

Unless otherwise specified, the diffractive surfaces of both gratings 270 and 272 have square groove profiles and can be located either on the top or on the bottom of their respective substrate. ADE angles and BDE angles are given with respect to the global coordinate system XYZ as described above in connection with FIGS. 3A and 3B. Alternatively, these angles could have been stated in terms of a polar coordinate system using θ and ω as described above in connection with FIG. 4.

a. FIRST EXAMPLE

In this example, no restrictions were placed on the number of wedge and tilt parameters that could be varied. Hence, wedge and tilt were combined to optimize both ADE tilt and BDE tilt for both the diffractive surface and the AR coated surface of each of the gratings 270 and 272. Both diffractive surfaces are located on top of their substrates as illustrated in FIG. 2C. A member of this family of solutions is summarized in Table 1. Front and rear surface ADE tilt, front and rear surface BDE tilt, maximum wedge, maximum wedge direction, and substrate thickness at the center of the substrate are given:

TABLE 1

FIRST EXAMPLE

| | | Coarse grating | Fine grating |
|---|---|---|---|
| Front surface (diffractive) | ADE tilt | −0.412° | −0.988° |
| | BDE tilt | 1.400° | 1.668° |
| Back surface (AR coated) | ADE tilt | 1.048° | 0.472° |
| | BDE tilt | −0.420° | −0.152° |
| Max wedge | | 2.333° | 2.333° |
| Max wedge direction (w.r.t. x-axis) | | 38.74° | 38.74° |
| Thickness at center | | 22.00 mm | 15.52 mm |

Because all ten tilt parameters (including that of the object O, which can be considered part of the optical assembly 262 for the purposes of tilt selection discussion) can be optimized in accordance with this solution, all stray beams can be steered away from the pupil 78 of the imaging device 64. Consequently, high-order diffractions created by the sharp edges of the square groove profile of the diffractive surfaces of the gratings 270 and 272 are not an issue. The average phase offset of the instrument 20 is zero, and no phase offset variations remain over the entire field of view of the instrument.

b. SECOND EXAMPLE

In some instances, it may be desirable to simplify the manufacturing process by constraining the substrates of both gratings 270 and 272 to be identical, i.e., to have identical maximum wedges and to have identical thickness. A member of the resultant family of optimal solutions is summarized in Table 2:

TABLE 2

SECOND EXAMPLE

|  |  | Coarse grating | Fine grating |
|---|---|---|---|
| Front surface (diffractive) | ADE tilt | 1.646° | 0.280° |
|  | BDE tilt | 0.882° | −0.110°0 |
| Back surface (AR coated) | ADE tilt | 0.146° | 1.780° |
|  | BDE tilt | −0.618° | 1.390° |
| Max wedge |  | 2.121° | 2.121° |
| Max wedge direction (w.r.t. x-axis) |  | 45.000° | 225.000° |
| Thickness at center |  | 17 mm | 17 mm |

It should be appreciated from above that fewer parameters can be optimized due to the fact that the maximum wedge, wedge direction and substrate thickness must be the same for both of the diffraction gratings 270 and 272. As a result, while the average phase offset is zero, a tolerably small phase offset variation (on the order of ±6 fringes across a 100 mm field of view) remains across the instrument's field of view.

c. THIRD EXAMPLE

In this example, further constraints were placed upon design versatility to further simplify manufacturing. The rotation of all surfaces of the substrates 270 and 272 about the X axis was constrained to be zero. This constraining requirement alone is sufficient to guarantee that the average phase offset is zero at the optimum metrology plane. Optimization of the five remaining tilt parameters (including that of the object O) can be used to steer stray beams away from the pupil 78 of the imaging device 64. Furthermore, if identical substrates are used for the two diffraction gratings 270 and 272, phase offset variations across the field of view are eliminated. A member of the resultant family of optimal solutions is tabulated in Table 3:

TABLE 3

THIRD EXAMPLE

|  |  | Coarse grating | Fine grating |
|---|---|---|---|
| Front surface (diffractive) | ADE tilt | 0.000° | 0.000° |
|  | BDE tilt | −1.386° | −1.489° |
| Back surface (AR coated) | ADE tilt | 0.000° | 0.000° |
|  | BDE tilt | 0.114° | 0.011° |
| Max wedge |  | 1.500° | 1.500° |
| Max wedge direction (w.r.t. x-axis) |  | 180.000° | 180.000° |
| Thickness at center |  | 19.44 mm | 19.44 mm |

An instrument can be manufactured in accordance with this example even more easily than the prior examples because the wedges are oriented parallel to the substrate edge. Moreover, arranging the wedges of both diffractive surfaces in the same direction inherently provides for zero average phase offset as well as zero phase offset variation over the entire field of view of the instrument 20. This configuration also is completely achromatic over the instrument's entire field of view.

Because only four optimization parameters can be varied in this example, the effects of high-order diffractions are more difficult to eliminate by back reflection management alone. Hence, this example is most effective when wedge and tilt selection are used in combination with diffractive surfaces in which the grating profiles have smooth edges as described in Section 4 above.

d. FOURTH EXAMPLE

Figure 6:
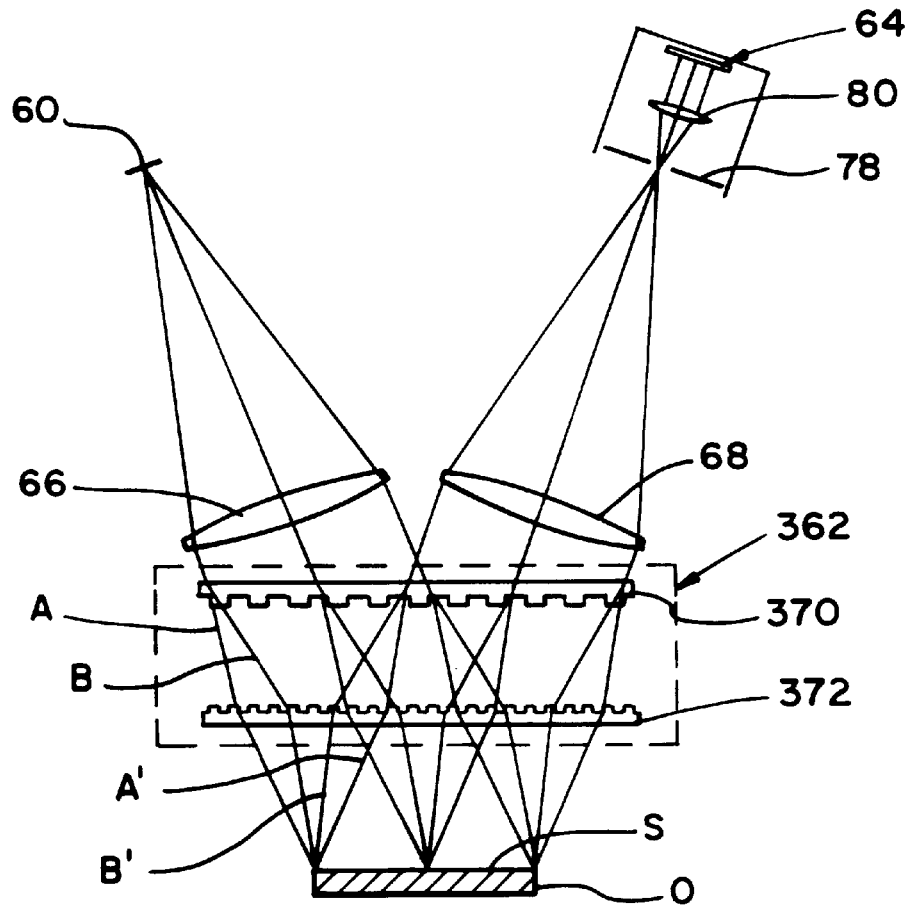
FIG. 6 generally corresponds to FIG. 2C and schematically represents yet another embodiment of an optical assembly usable in a GDI instrument constructed in accordance with the present invention.

This example follows a slightly different approach than the prior examples. In this approach, wedge and tilt are first optimized, without regard to phase offset, to maximize deviation of stray beams from the pupil 78. The average phase offset at the optimum metrology plane is then eliminated or at least minimized by suitable selection of the effective thickness of a portion of the optical assembly. For instance, and as seen in FIG. 6, the diffractive surface of the first grating 370 of an optical assembly 362 can be located on the bottom or rear surface of the grating's substrate as opposed to the front surface, thereby decreasing the effective thickness of that grating. Optical assembly 362 is otherwise identical to the optical assembly 262 of FIG. 2C, and its components therefore are denoted by the same reference numerals as the corresponding components of optical assembly 262, incremented by 100. A member of a family of solutions achieving the desired effects in accordance with this example is tabulated in Table 4:

TABLE 4

FOURTH EXAMPLE

|  |  | Coarse grating |  | Fine grating |  |
|---|---|---|---|---|---|
| Front surface | ADE tilt | AR coated | −1.013° | Diffractive | 0.521° |
|  | BDE tilt |  | −2.786° |  | −1.277° |
| Back surface | ADE tilt | Diffractive | −1.013° | AR coated | −1.779° |
|  | BDE tilt |  | −1.286° |  | −0.727° |
| Max wedge |  | 1.500° |  | 2.364° |  |
| Max wedge direction (w.r.t. x-axis) |  | 180.000° |  | 103.449° |  |
| Thickness at center |  | 19.46 mm |  | 15.50 mm |  |

The solution tabulated in Table 4, as well as other solutions of this family, can be designed with a negligible amount of average phase offset and phase offset variation across the instrument's field of view when the test surface S of the object O is located in the optimum metrology plane. Because the diffractive surface of the first grating 370 is now on the bottom of its substrate, fewer high-order diffraction stray beams are created. Hence, smoothed grating groove profile is not required for this family.

Locating the diffractive surface of the first diffraction grating 370 on the bottom of the substrate of that grating is tantamount to introducing a virtual glass plate of negative thickness between the two gratings 370 and 372. This is also tantamount to increasing the equivalent thickness of the substrate of the second grating 372 without increasing the actual thickness of the substrate.

Figure 7:
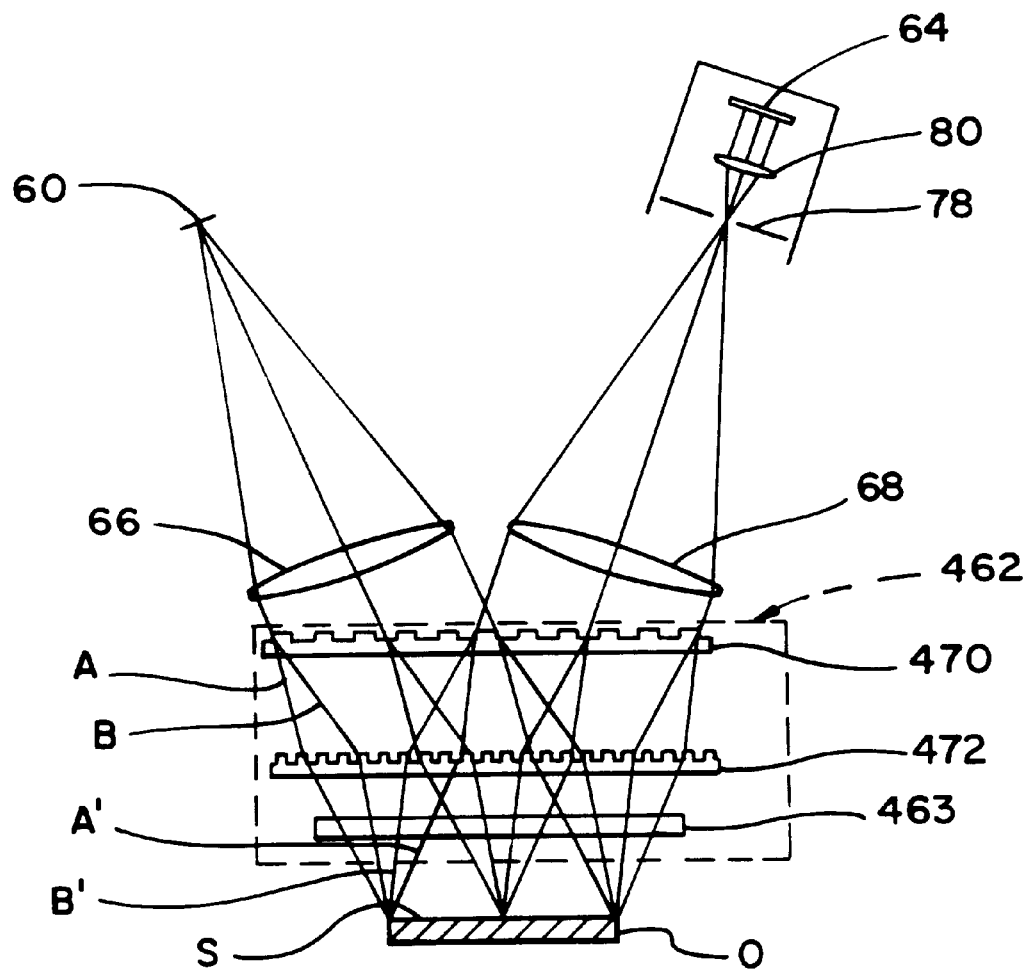
FIG. 7 generally corresponds to FIG. 2C and schematically represents still another embodiment of an optical assembly usable in a GDI instrument constructed in accordance with the present invention.
Figure 8:
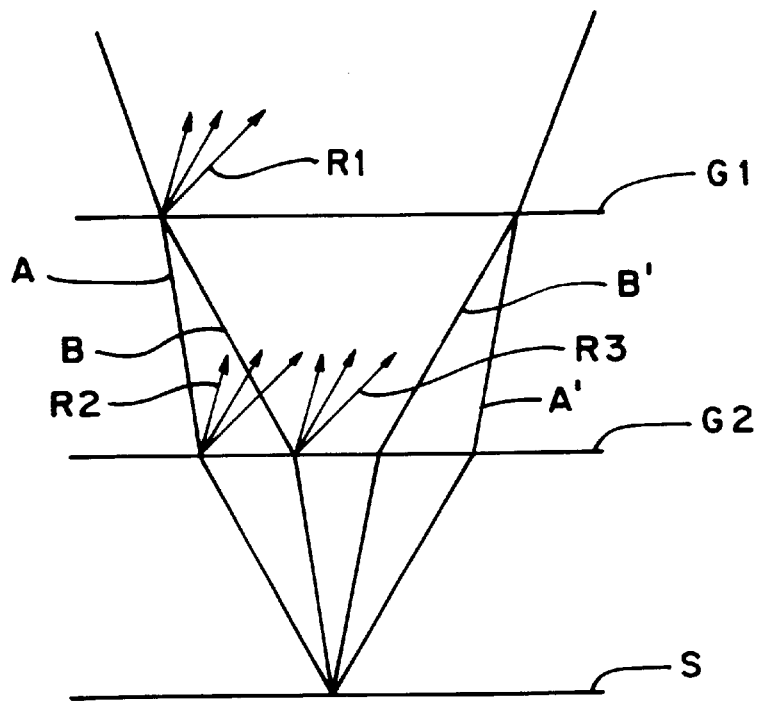
FIG. 8 schematically illustrates back reflection of a GDI instrument.
Figure 9:
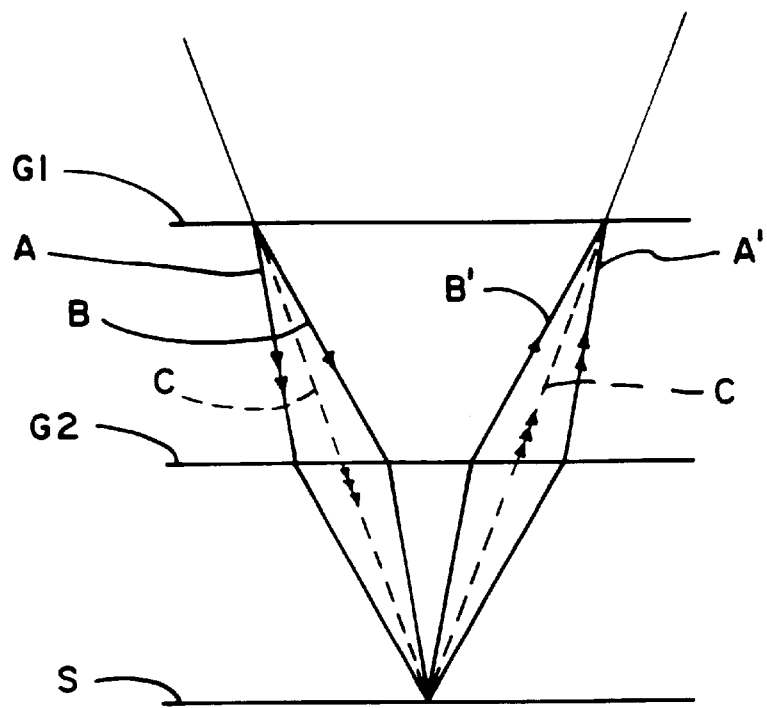
FIG. 9 schematically illustrates undesired diffraction order propagation creating object ghosts in a GDI instrument.

Instead of or in addition to these approaches, a transparent compensating plate can be introduced into the optical assembly, thereby permitting more universal substrates to be used for the first and second gratings. An optical assembly 462 constructed in this manner is illustrated in FIG. 7 and incorporates 1) first and second gratings 470 and 472 that are identical to the gratings 270 and 272 of FIG. 2C and 2) a compensating plate 463 located between the second grating 472 and the object O. Optical assembly 462 is otherwise identical to the optical assembly 262 of FIG. 2C, and its components therefore are denoted by the same reference numerals as the corresponding components of optical assembly 262, incremented by 200. Depending upon the results sought, the compensating plate 463 could alternatively be located between the first and second gratings 470 and 472 or could even form the support structure for the test object O.

6. Benefits and Conclusions

A GDI instrument constructed in accordance with the invention has several beneficial characteristics. First, because phase offset is eliminated or at least minimized at the optimum metrology plane, the operator need not reposition the object O for measurement after placing it in the region of maximum interference fringe contrast. The lack of phase offset and the resultant more accurate positioning of the object test surface S in the optimum metrology plane also results in improved metrology of plane-parallel transparent parts. Second, because the signal-to-noise ratio is greatly reduced, rough surfaces and other weakly reflective surfaces can be imaged in low coherence mode—negating the need to switch the instrument 20 between low coherence mode and high coherence mode. The resultant ability to use only a single source size for both smooth and rough surfaces also helps to reduce speckle noise for smooth parts and high-frequency noise caused by grating periodicity defects. In addition, due to the fact that ghost reflections are reduced and stray beams are directed away from the pupil, poorly reflective and/or highly scattering parts can be measured with greater accuracy. These benefits also improve the scanning capability of the instrument, permitting higher accuracy of measurements in a depth-scanning mode such as the scanning mode disclosed in the above-described de Groot '265 patent.

Many changes and modifications can be made to the present invention without departing from the spirit thereof. The scope of some of these changes is discussed above. The scope of other changes will become apparent from the appended claims.

We claim:

1. A geometrically-desensitized interferometer for profiling a test object surface, said interferometer comprising:
   (A) a light generator spaced from the test object surface in a Z direction;
   (B) an optical assembly which is disposed between said light generator and the test object surface and which is configured to 1) divide light received from said light generator into first and second impinging beams which a) propagate in two different directions, b) impinge upon the test object surface, and c) generate first and second reflected beams from the test object surface and 2) recombine said first and second reflected beams propagating from the test object surface to form an interference pattern which is representative of a characteristic of the test object surface;
   (C) an imaging device which is disposed on a common side of said optical assembly with said light generator and which has an aperture arranged to receive light transmitted through said optical assembly by said light generator and reflected back through said optical assembly by the test object surface, wherein
      said optical assembly is spaced from the test object surface by a distance H' in the Z direction that places the test object surface in or closely adjacent to an optimum metrology plane in which said first and second reflected beams originate at the same location on said test object surface but at different incident angles, wherein
      said optical assembly is configured to steer stray light beams away from said aperture of said imaging device while at least essentially minimizing phase offset, and wherein phase offset is an optical phase difference proportional to the difference in optical path length of said first and second reflected beams.

2. An interferometer as defined in claim 1, wherein said optical assembly comprises first and second diffractive optical devices.

3. An interferometer as defined in claim 2, wherein each of said first and second diffractive optical devices comprises a diffraction grating extending at least generally in an X-Y plane which is perpendicular to said Z direction, wherein each of said diffraction gratings comprises a substrate having a front surface facing said light source and a rear surface facing the test object surface, and wherein one of said surfaces is a diffractive surface and the other of said surfaces is an AR-coated surface.

4. An interferometer as defined in claim 3, wherein at least one of said first and second diffraction gratings is tilted out of the X-Y plane about an axis parallel to the Y direction.

5. An interferometer as defined in claim 3, wherein at least one of said first and second diffraction gratings is tilted out of the X-Y plane about an axis parallel to the X direction.

6. An interferometer as defined in claim 3, wherein at least one of said first and second diffraction grating S is tilted out of the X-Y plane about an axis parallel to the X direction and about an axis parallel to the Y direction.

7. An interferometer as defined in claim 3, wherein said substrates of said first and second diffraction gratings have essentially identical wedge angles and wedge directions, wherein a wedge angle is the angle between the front and back surfaces of a substrate of an associated diffraction grating, nominally equal to zero for parallel surfaces, and wherein wedge direction is a direction within the plane of a surface of a substrate for which the wedge has the greatest magnitude.

8. An interferometer as defined in claim 3, wherein a groove profile of the diffractive surface of at least one of said diffraction gratings is selected to minimize high-order diffractions.

9. An interferometer as defined in claim 3, wherein said first and second diffraction gratings have different wedge angles and wedge directions.

10. An interferometer as defined in claim 3, wherein at least one of a wedge angle, a wedge direction, and a tilt angle of at least one of said first and second diffraction gratings is selected to at least essentially eliminate stray beam transmission to said aperture of said imaging device without avoiding phase offset, and wherein at least one component of said optical assembly has an effective thickness that is selected to minimize phase offset when the object is at said optimum metrology plane.

11. An interferometer as defined in claim 10, wherein the diffractive surface of said first diffraction grating is located on said rear surface thereof, thereby increasing the effective thickness of said second diffraction grating.

12. An interferometer as defined in claim 10, wherein said optical assembly further comprises a compensating plate formed from a transparent material, said compensating plate being disposed between one of (1) said first and second diffraction gratings and (2) said second diffraction grating and the test object surface, the thickness of said compensating plate being selected to minimize phase offset when the object is at said optimum metrology plane.

13. An interferometer as defined in claim 12, wherein said compensating plate comprises a test object support surface.

14. An interferometer as defined in claim 1, wherein said optical assembly is configured to minimize average phase offset of said interferometer.

15. An interferometer as defined in claim 14, wherein said optical assembly is configured to essentially eliminate phase offset variation over the field of view.

16. An interferometer as defined in claim 3, wherein groove profiles of the diffractive surfaces of at least one of said first and second diffraction gratings are shaped to suppress reflection or transmission of diffraction orders other than desired diffraction orders.

17. An interferometer as defined in claim 16, wherein said groove profiles (1) are arranged in two distinct regions of different blazing directions and (2) diffract light only in a $0^{th}$ order and a $-1^{th}$ order in a first region and a $0^{th}$ order and a $+1^{th}$ order in a second region.

18. An interferometer as defined in claim 16, wherein said groove profiles are arranged in a single region of a single blazing direction and diffract light in only a $0^{th}$ order and in only one of a $-1^{th}$ order and a $+1^{th}$ order.

19. An interferometer as defined in claim 16, wherein said groove profiles are generally square in shape and diffract light in only a $-1^{th}$ order and a $+1^{th}$ order.

20. A geometrically-desensitized interferometer for profiling a test object surface, said interferometer comprising:
(A) a light generator spaced from the test object surface in a Z direction;
(B) an optical assembly which is disposed between said light generator and the test object surface and which is configured to 1) divide light received from said light generator into first and second impinging beams which a) propagate in two different directions, b) impinge upon the test object surface, and c) generate first and second reflected beams from the test object surface and 2) recombine first and second reflected beams propagating from the test object surface to form an interference pattern which is representative of a characteristic of the test object surface, said optical assembly including first and second diffraction gratings which extend generally in an X-Y plane which is perpendicular to the Z direction, wherein each of said diffraction gratings comprises a substrate having a front surface facing said light source and a rear surface facing the test object surface, and wherein one of said surfaces is a diffractive surface and the other of said surfaces is an AR-coated surface;
(C) an imaging device which is disposed on a common side of said optical assembly with said light generator and which has an aperture arranged to receive light transmitted through said optical assembly by said light generator and reflected back through said optical assembly by the test object surface, wherein
said optical assembly is spaced from the test object surface by a distance H' in the Z direction that places the test object surface in or closely adjacent to an optimum metrology plane in which said first and second reflected beams originate at the same location on said test object surface but at different incident angles,
wherein each of said diffraction gratings has at least one of a wedge angle, a wedge direction, and a tilt angle selected to steer stray light beams away from said aperture of said imaging device while avoiding average phase offset and while minimizing a phase offset variation, and wherein
phase offset is an optical phase difference proportional to the difference in optical path length of said first and second reflected beams.

21. A geometrically-desensitized interferometer for profiling a test object surface, said interferometer comprising:

(A) a light generator spaced from the test object surface in a Z direction;
(B) an optical assembly which is disposed between said light generator and the test object surface and which is configured to 1) divide light received from said light generator into first and second impinging beams which a) propagate in two different directions, b) impinge upon the test object surface, and c) generate first and second reflected beams from the test object surface and 2) recombine first and second reflected beams propagating from the test object surface to form an interference pattern which is representative of a characteristic of the test object surface, wherein
said optical assembly is spaced from the test object surface by a distance H' in the Z direction that places the test object surface in or closely adjacent to an optimum metrology plane in which said first and second reflected beams originate at the same location on said test object surface but at different incident angles,
each of said first and second optical devices comprise a diffraction grating extending generally in an X-Y plane which is perpendicular to the Z direction, each of said diffraction gratings comprising a substrate having a front surface facing said light source and a rear surface facing the test object surface, wherein one of said surfaces is a diffractive surface and the other of said surfaces is an AR-coated surface, and wherein
a groove profile of the diffractive surface of at least one of said first and second diffraction gratings has curved portions that minimize high order diffraction.

22. An interferometer as defined in claim 21, further comprising an imaging device which is disposed on a common side of said optical assembly with said light generator and which has an aperture arranged to receive light transmitted through said optical assembly by said light generator and reflected back through said optical assembly by the test object surface, and wherein said first and second diffraction gratings are configured to steer stray light beams away from said aperture of said imaging device while avoiding phase offset, phase offset being an optical phase difference proportional to the difference in optical path length of said first and second reflected beams.

23. An interferometer as defined in claim 21, wherein said one diffraction grating has a generally square groove profile.

24. An interferometer as defined in claim 21, wherein said one diffraction grating is a blazed grating having a generally triangular groove profile.

25. A method of operating a geometrically-desensitized interferometer, said interferometer including a light generator, an optical assembly, and an imaging device which is disposed on a common side of said optical assembly with said light generator, said method comprising the steps of:
(A) transmitting light
(1) from said light generator and onto said optical assembly at a range of incident angles $\Delta\gamma$ with respect to a line extending perpendicularly with respect to said optical assembly,
(2) through said optical assembly,
(3) to a surface of an object as first and second beams that impinge on said surface, and reflect from said surface as first and second reflected beams wherein said surface is located in an optimum metrology plane in which said first and second reflected beams originate at the same location but at different incident angles, (4) back through said optical assembly, and (5) to an aperture of said imaging device as an interference pattern the contrast of which is dependent on the magnitude of $\Delta\gamma$; and, during the transmitting step, (B) steering stray light beams away from said aperture of said imaging device while minimizing phase offset, wherein phase offset is an optical phase difference proportional to the difference in optical path length of said first and second reflected beams.

26. A method as defined in claim 25, wherein said optical assembly comprises first and second diffraction gratings each having a diffractive surface, and further comprising, during the transmitting step, suppressing spurious reflections and diffractions from said diffractive surfaces.

27. A method as defined in claim 26, further comprising, during the transmitting step, suppressing high-order diffractions.

28. A method as defined in claim 25, further comprising, during the transmitting step, minimizing a phase offset variation of said interferometer.

29. A method of operating a geometrically-desensitized interferometer, said interferometer including a light generator, an optical assembly, and an imaging device which is disposed on a common side of said optical assembly with said light generator, said method comprising the steps of:

(A) transmitting light (1) from said light generator and onto said optical assembly at a range of incident angles $\Delta\gamma$ with respect to a line extending perpendicularly with respect to said optical assembly, (2) through a first diffraction grating of said optical assembly, thereby dividing said light into first and second diverging beams, then (3) through a second diffraction grating of said optical assembly, thereby deflecting said light into first and second beams, (4) to a surface of an object as said first and second beams that impinge on said surface, and reflect from said surface as first and second reflected beams, wherein said surface is located in an optimum metrology plane in which said first and second reflected beams originate at the same location but at different incident angles, (5) back through said optical assembly, and (6) to an aperture of said imaging device as an interference pattern the contrast of which is dependent on the magnitude of $\Delta\gamma$; during the transmitting step, (B) steering stray light beams away from said aperture of said imaging device while at least essentially avoiding phase offset, wherein phase offset is an optical phase difference proportional to the difference in optical path length of said first and second reflected beams; and (C) minimizing a phase offset variation of said interferometer.

30. A method as defined in claim 29, wherein, for each of said first and second diffraction gratings, the steering step comprises selecting at least one of a wedge angle, a wedge direction, and a tilt direction that results in the steering step.

31. A method as defined in claim 30, wherein the selecting step takes phase offset into account so that phase offset is avoided as a result of the selecting step.

32. A method as defined in claim 30, wherein the selecting step does not take phase offset into account, and wherein phase offset is minimized by transmitting light through a compensating plate disposed between one of (1) said first and second diffraction gratings and (2) said second diffraction grating and said surface.

* * * * *